United States Patent
Sun et al.

(10) Patent No.: US 10,319,118 B2
(45) Date of Patent: Jun. 11, 2019

(54) RECONSTRUCTING PET IMAGE

(71) Applicant: Shenyang Neusoft Medical Systems Co., Ltd., Shenyang (CN)

(72) Inventors: Zhipeng Sun, Shenyang (CN); Jie Chang, Shenyang (CN)

(73) Assignee: Shenyang Neusoft Medical Systems Co., Ltd., Shenyang (CN)

(*) Notice: Subject to any disclaimer, the term of this patent is extended or adjusted under 35 U.S.C. 154(b) by 107 days.

(21) Appl. No.: 15/793,400

(22) Filed: Oct. 25, 2017

(65) Prior Publication Data

US 2018/0114346 A1 Apr. 26, 2018

(30) Foreign Application Priority Data

Oct. 25, 2016 (CN) .......................... 2016 1 0940112

(51) Int. Cl.
G06K 9/00 (2006.01)
G06T 11/00 (2006.01)
G01S 7/486 (2006.01)

(52) U.S. Cl.
CPC .......... *G06T 11/006* (2013.01); *G01S 7/4866* (2013.01); *G06T 11/005* (2013.01); *G06T 2207/10104* (2013.01)

(58) Field of Classification Search
CPC ..... A61B 6/037; A61B 6/4258; A61B 6/5205; A61B 6/4216; G01T 1/2985; G01T 1/2018; G01T 1/1603; G01T 1/1642; G01T 1/1644; G01T 1/1647
USPC ...................................... 382/131; 250/363.04
See application file for complete search history.

(56) References Cited

U.S. PATENT DOCUMENTS

| | | | |
|---|---|---|---|
| 8,094,908 B2* | 1/2012 | Stearns ................. | A61B 6/037 250/363.04 |
| 10,049,465 B2* | 8/2018 | Jain ......................... | G06T 7/60 |
| 10,215,864 B2* | 2/2019 | Herraiz ................. | G01T 1/1647 |
| 2017/0332983 A1* | 11/2017 | Tai ........................ | G01T 1/2985 |

* cited by examiner

*Primary Examiner* — Charlotte M Baker
(74) *Attorney, Agent, or Firm* — Fish & Richardson P.C.

(57) ABSTRACT

Methods, systems, and machine-readable storage mediums for reconstructing a PET image are provided. In one aspect, a method includes: determining a plurality of LORs associated with multiple-coincidence data in coincidence data detected by a PET device through scanning, obtaining a respective line integral value along each of the LORs according to a time difference between two single events corresponding to the LOR, allocating the multiple-coincidence data to the LORs according to the respective line integral values of the LORs to obtain respective multiple allocation data on the LORs, correcting respective double-coincidence data in the coincidence data corresponding to each of the LORs based on the respective multiple allocation data on the LOR to obtain data of the LOR, and reconstructing an image according to the data of each of the LORs.

20 Claims, 4 Drawing Sheets

RECONSTRUCTING PET IMAGE

CROSS REFERENCE TO RELATED APPLICATIONS

This application claims priority to Chinese Patent Application No. 201610940112.4 entitled "Method and Apparatus for Reconstructing PET Image" filed on Oct. 25, 2016, the entire content of which is incorporated herein by reference.

TECHNICAL FIELD

The present disclosure relates to medical image processing technologies, and more particularly, to reconstructing a PET image.

BACKGROUND

At present, Positron Emission Computed Tomography (PET) technologies have been widely applied to biomedical research fields, e.g., early tumor detection research and drug screening research. Based on the PET technologies, a radioactive tracer is injected into a subject, a photon signal generated by an annihilation event is detected in vitro, and spatial distribution of the tracer in vivo is reconstructed according to the detected data. Thus, physiological metabolism information about the subject can be indirectly obtained.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, systems, and machine-readable storage mediums for reconstructing a PET image by allocating multiple-coincidence data to each of LORs, which can effectively improve PET sensitivity and an image quality of the reconstructed PET image.

One innovative aspect of the subject matter described in the present disclosure can be embodied in methods that include the actions of determining a plurality of Lines of Response (LORs) associated with multiple-coincidence data in coincidence data detected by a PET device through scanning, the coincidence data including double-coincidence data indicating that two single events satisfy a coincidence condition and the multiple-coincidence data indicating that three or more single events satisfy the coincidence condition, and each of the LORs being a line between crystals corresponding to every two of the three or more single events corresponding to the multiple-coincidence data; obtaining, for each of the LORs, a respective line integral value along the LOR according to a time difference between two single events corresponding to the LOR; allocating the multiple-coincidence data to the LORs according to the obtained respective line integral values of the LORs associated with the multiple-coincidence data, a respective part of the multiple-coincidence data allocated to each of the LORs being respective multiple allocation data on the LOR; correcting, for each of the LORs, respective double-coincidence data in the coincidence data corresponding to the LOR based on the respective multiple allocation data on the LOR to obtain respective data of the LOR; and reconstructing an image according to the respective data of each of the LORs.

The foregoing and other embodiments can each optionally include one or more of the following features, alone or in combination. In some implementations, obtaining the respective line integral value along the LOR includes: determining a Time-of-Flight (TOF) kernel function according to the time difference between the two single events corresponding to the LOR; and integrating the TOF kernel function and pixel values of a second image in a corresponding range along the LOR to obtain the line integral value of the LOR associated with the multiple-coincidence data, where the second image is reconstructed according to the double-coincidence data in the coincidence data. The corresponding range can be determined based on the TOF kernel function and can have a width larger than a width of an event occurrence region on the LOR that is determined based on the time difference between the two single events.

In some cases, determining the TOF kernel function according to the time difference between the two single events includes: obtaining a function center of the TOF kernel function according to the time difference between the two single events; and determining the TOF kernel function according to the function center. In some cases, determining the TOF kernel function according to the time difference between the two single events includes: obtaining a midpoint of a time difference region corresponding to the time difference between the two single events; obtaining a function center of the TOF function according to the midpoint; and determining the TOF kernel function according to the function center.

In some implementations, obtaining the respective line integral value along the LOR includes: dividing the LOR into a plurality of event occurrence regions based on time difference regions; performing TOF orthographic projection for a second image to obtain a respective line integral value corresponding to each of the plurality of event occurrence regions on the LOR, where the second image is reconstructed according to the double-coincidence data in the coincidence data; generating correspondences between the time difference regions and the respective line integral values corresponding to the plurality of event occurrence regions on the LOR; and obtaining the line integral value along the LOR according to the time difference between the two single events corresponding to the LOR and the correspondences.

Allocating the multiple-coincidence data to the LORs can include: allocating a respective proportion of a count value of the multiple-coincidence data to each of the LORs according to the respective line integral values of the LORs associated with the multiple-coincidence data. Correcting the respective double-coincidence data in the coincidence data corresponding to the LOR based on the respective multiple allocation data on the LOR can include: adding a count value of the multiple allocation data on the LOR and a count value of the double-coincidence data corresponding to the LOR together to obtain a corrected count value; and taking the corrected count value as a count value of the data of the LOR.

In some cases, reconstructing the image according to the respective data of each of the LORs includes: generating a scatter correction factor and an attenuation correction factor according to the respective data of each of the LORs; and reconstructing the image according to the scatter correction factor, the attenuation correction factor and the respective data of each of the LORs.

Another aspect of the subject matter described in the present disclosure can be embodied in methods that include the actions of reconstructing a first PET image according to double coincidence data in coincidence data detected by a PET device through scanning; determining a plurality of lines of response (LOR) associated with multiple-coincidence data in the coincidence data, each of the LORs being a line between crystals corresponding to every two of three or more single events corresponding to the multiple-coincidence data; determining a respective weight for each of the LORs based on a time difference between two single events corresponding to the LOR and an overlapping region between the first PET image and the LOR; allocating the multiple-coincidence data to the LORs based on the determined respective weights to obtain respective multiple allocation data on the LORs; correcting, for each of the LORs, respective double-coincidence data in the coincidence data corresponding to the LOR based on the respective multiple allocation data on the LOR to obtain respective data of the LOR; and reconstructing a second PET image according to the respective data of the LORs.

Determining a respective weight for each of the LORs can include: determining a Time-of-Flight (TOF) kernel function according to the time difference between the two single events corresponding to the LOR; and integrating the TOF kernel function and pixel values of the first PET image in an integral range along the LOR to obtain a line integral value of the LOR associated with the multiple-coincidence data, wherein the line integral value is determined to be the respective weight for the LOR. The integral range can be determined based on the TOF kernel function and have a width larger than a width of an event occurrence region on the LOR that is determined based on the time difference between the two single events.

Other embodiments of these aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are examples of an apparatus and a method consistent with some aspects of the present disclosure described in detail in the appended claims.

After a radionuclide is injected into a subject, annihilation events occur in vivo, and a γ-photon generated by an annihilation event may be detected by a crystal on a PET device. When detecting a γ-photon with energy higher than a predetermined energy threshold, the crystal may record that a single event is detected. When two single events satisfy time coincidence, e.g., detected in a time window, the two single events constitute a coincidence event, e.g., it is indicated that two γ-photons corresponding to the two single events are photons which are generated by a same annihilation event and have same energy and opposite directions. A line between two crystals corresponding to the detected coincidence event is a Line of Response (LOR) (or response line). The detected coincidence event may be a double-coincidence event or a multiple-coincidence event. When the number of single events which are detected in a time window and satisfy a coincidence condition is equal to 2, the detected coincidence event is a double-coincidence event. When the number of single events which are detected in a time window and satisfy the coincidence condition is more than 2, the detected coincidence event is a multiple-coincidence event.

In some cases, it is hard to determine which LOR associated with a multiple-coincidence event is true, and the PET device may discard corresponding multiple-coincidence data. In some cases, the PET device may use the multiple-coincidence data to improve sensitivity of the PET device. For example, the double-coincidence data and the multiple-coincidence data are separately determined, and the multiple-coincidence data is allocated to various LORs associated with the multiple-coincidence data based on a proportion of count values in the double-coincidence data on the LORs. However, when the count values of the double-coincidence data are small, the amount of the determined coincidence data above is not sufficient. When the allocation above is still in accordance with the proportion of the count values in the double-coincidence data, an allocation result cannot be accurate, and a quality of a PET image reconstructed according to the coincidence data on the LORs is bad.

In an example of the present disclosure, coincidence data is information of a coincidence event. For example, the coincidence data includes γ-photon energy information, reception time information, reception position information and a count value of γ-photon corresponding to each single event in a coincidence event. The number of single events in the coincidence event may be equal to 2. For example, a crystal J1 detects a single event, and a crystal J2 detects another single event. When each of γ-photons corresponding to the two single events satisfies an energy threshold and a difference between reception times of the γ-photons corresponding to the two single events satisfies a time coincidence, the two single events constitute a double-coincidence event, and data of the two single events constitute double-coincidence data. Further, a multiple-coincidence event may occur. The multiple-coincidence event may be a triple-coincidence event, a quadruple-coincidence event, or a coincidence event including even more single events satisfying a coincidence condition. In an example, a crystal J1 detects a single event, a crystal J2 detects another single event, and a crystal J3 detects yet another single event. When each of γ-photons corresponding to the three single events satisfies an energy threshold and reception time of each of the γ-photons corresponding to the three single events is within a same time window, e.g., satisfying the time coincidence, the three single events constitute a triple-coincidence event, and corresponding triple-coincidence data includes data of the three single events.

The coincidence data detected by the PET device may include the double-coincidence data or the multiple-coincidence data. For each of LORs corresponding to the coincidence data, the coincidence data on the LOR may include double-coincidence data and multiple-coincidence data. An LOR between the crystal J1 and the crystal J2 is taken as an example. A plurality of coincidence events are detected on the LOR. The coincidence events includes a double-coincidence "D1 (a single event detected by the crystal J1) and D2 (a single event detected by the crystal J2)", and a triple-coincidence event "D3 (a single event detected by the crystal J1), D4 (a single event detected by the crystal J2) and D5 (a single event detected by a crystal J3)". In the example, information of the single events for the two crystals (J1 and J2) on the LOR is a part of the triple-coincidence data.

Two photons which are generated by an annihilation event and have equal energy and opposite directions correspond to two single events. The multiple-coincidence event includes more than two single events. It is hard to accurately determine which two single events correspond to the true coincidence event, e.g., which two single events corresponds to two γ-photons which are generated by a same annihilation event and have equal energy and opposite directions. Thus, the multiple-coincidence data may be discarded when the PET image is reconstructed according to the coincidence data obtained by the PET device. For example, in the triple-coincidence event "D3, D4 and D5", the true coincidence event may include D3 and D4, D3 and D5, or D4 and D5, which is hard to be accurately determined. According to methods of reconstructing a PET image in examples of the present disclosure, the multiple-coincidence data is used to reconstruct a PET image in a way that a sensitivity of a PET device is improved.

The multiple-coincidence data can be effectively used, e.g., the multiple-coincidence data can be accurately allocated to various LORs in a way that a quality of an image reconstructed according to the coincidence data on the LORs is good. For example, the triple-coincidence data includes three single events each of which satisfies a coincidence condition, e.g., D3 detected by the crystal J1, D4 detected by the crystal J2, and D5 detected by the crystal J3. Three LORs corresponding to the triple-coincidence data are $LOR_{12}$ (a line between the crystal J1 and the crystal J2), $LOR_{13}$ (a line between the crystal J1 and the crystal J3) and $LOR_{23}$ (a line between the crystal J2 and the crystal J3). The triple-coincidence data may be allocated for $LOR_{12}$, $LOR_{13}$ and $LOR_{23}$, which can indicate probabilities that the true coincidence event is on each of the LORs. For example, it is assumed that in the triple-coincidence data, a count value 0.5 is allocated for $LOR_{12}$, a count value 0.25 is respectively allocated for $LOR_{13}$ and $LOR_{23}$. It is indicated that a probability that the true coincidence event is on $LOR_{12}$ is largest, i.e., it is most possible that the true coincidence event is on $LOR_{12}$, a probability that the true coincidence event includes D3 and D4 is large, a probability that the true coincidence event includes D3 and D4 and a probability that the true coincidence event includes D4 and D5 are small.

Figure 1:
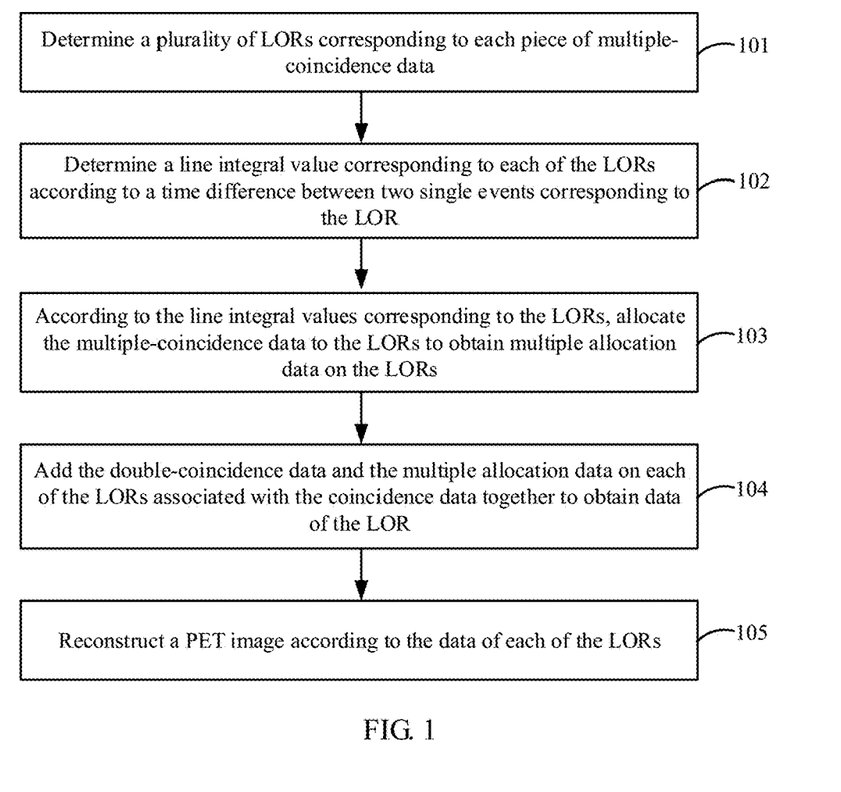
FIG. 1 is a flowchart illustrating a method of reconstructing a PET image according to an example of the present disclosure.

FIG. 1 is a flow chart of a process illustrating a method of reconstructing a PET image according to an example of the present disclosure. An image is reconstructed according to coincidence data detected by a PET device. The coincidence data includes double-coincidence data and multiple-coincidence data. In this example, a triple-coincidence data is taken as an example of the multiple-coincidence data. A method for another multiple-coincidence data is the same as that for the triple-coincidence data, which is not repeatedly described herein. In FIG. 1, it is described how the multiple-coincidence data is allocated to different LORs and how the allocated data is used to reconstructing an image.

At step 101, a plurality of LORs corresponding to each piece of multiple-coincidence data is determined.

Each of the LORs corresponding to the multiple-coincidence data is a line between crystals corresponding to every two of single events in the multiple-coincidence data. For example, in FIG. 2, it is assumed that a triple-coincidence event "D3, D4 and D5" are detected by crystals J1, J2 and J3, which respectively correspond to three LORs: $LOR_{12}$, $LOR_{13}$ and $LOR_{23}$. The $LOR_{12}$ is a line between the two crystals J1 and J2 corresponding to the single events D3 and D4. The $LOR_{13}$ is a line between the two crystals J1 and J3 corresponding to the single events D3 and D5. The $LOR_{23}$ is a line between the two crystals J2 and J3 corresponding to the single events D4 and D5. In the example, triple-coincidence data is taken as an example of allocating the multiple-coincidence data. Another multiple-coincidence data can be allocated to LORs according to the same method as that for the triple-coincidence data.

At step 102, a line integral value corresponding to each of the LORs is determined according to a time difference between two single events corresponding to the LOR.

In the example, Time-of-Flight Positron Emission Tomography (TOF-PET) is used. In the PET, an exact position of a detected annihilation event on an LOR is not obtained. In image reconstruction, an annihilation event detected on each LOR is distributed to all paths of the LOR based on equal weights. In the example, according to TOF-PET, a position of the annihilation event which occurs on the LOR is determined based on a difference between times when the two γ-photons respectively arrive at two crystals.

Figure 2:
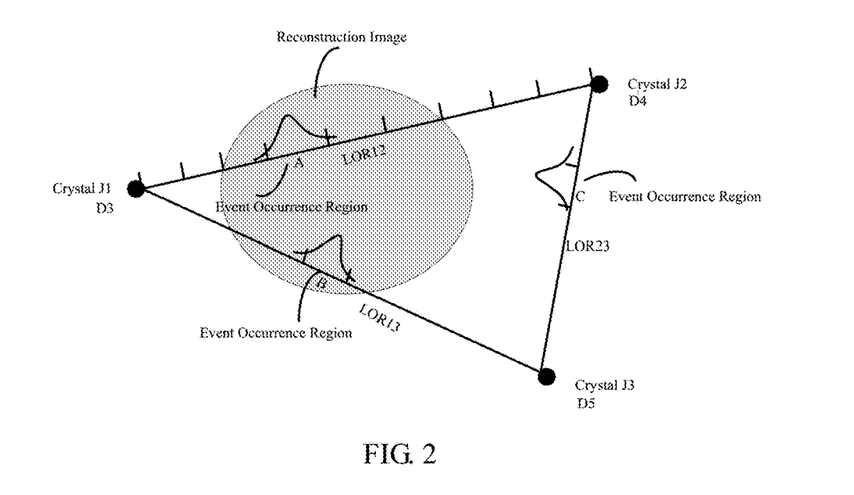
FIG. 2 is a schematic diagram illustrating a multiple-allocation process according to an example of the present disclosure.

When the time difference between the two single events in the coincidence event is obtained, an occurrence region of the coincidence event is positioned on an LOR. In an example, an LOR may be segmented based on a time difference region. In some examples, the LOR, e.g., a path between two crystal, is segmented into a number of event occurrence regions. The time difference region can be used to determine a length of an event occurrence region. In a particular example, each event occurrence region has a same length identical to a product of a time interval of the time difference region and a speed of light. The time difference region can include a region between a time difference t1 and a time difference t2. The time difference region can correspond to a path region on the LOR, which may be an event occurrence region. For example, it is assumed that a double-coincidence event is detected, a difference between reception times of two γ-photons corresponding to two single events in the coincidence event is t, where t1<t<t2. It is determined that an occurrence position of the coincidence event is within an event occurrence region corresponding to the time difference region [t1, t2] on the LOR. For another example, another time difference region is between a time difference t3 and a time different t4. The another time difference region corresponds to another path region on the LOR, which may be another event occurrence region. In FIG. 2, $LOR_{12}$ is taken as an example. The LOR is divided into a plurality of segments. Each of the segments corresponds to a time difference region. When a time difference between two single events in a coincidence event is within a time difference region, it is determined that the coincidence event occurs in the event occurrence region corresponding to the time difference region.

In the step, according to a time difference between two single events corresponding to each of LORs associated with the multiple-coincidence data, an event occurrence region corresponding to the time difference on the LOR may be determined. The triple coincidence data "D3, D4 and D5" is taken as an example. In FIG. 2, an event occurrence region A on the $LOR_{12}$ associated with the coincidence data may be determined according to a time difference between D3 and D4. An event occurrence region B corresponding to the coincidence data on the $LOR_{13}$ may be determined according to a time difference between D3 and D5. An event occurrence region C corresponding to the coincidence data on the $LOR_{23}$ may be determined according to a time difference between D4 and D5.

A line integral value corresponding to each of the LORs associated with the multiple-coincidence data may be obtained by performing a line integral for a TOF kernel function and pixel values of an image along the LOR, where the image is a reconstruction image obtained according to the double-coincidence data. Calculation for a line integral value relates to two factors, e.g., the TOF kernel function and the the pixel values of the image.

In an example, the TOF kernel function may be determined according to the time difference between two single events corresponding to the LOR.

For example, the TOF kernel function may be a function that a center is not lower than an edge, such as a Gaussian function, an exponential function, or a window function. The Gaussian function is taken as an example. A function center and a standard deviation of the Gaussian function are determined.

The function center μ of the Gaussian function is μ=c·$(t_2-t_1)/2$. The function center μ is determined based on the time difference $t_2-t_1$. For example, $LOR_{12}$ is taken as an example, $t_2$ and $t_1$ in the formula are times when two photons respectively arrive at the crystals J1 and J2, and c represents a velocity of light. In another example, the time difference $t_2-t_1$ used for determining the center of the Gaussian function is a midpoint of a time difference region including the time difference between two single events corresponding to the LOR. For example, the time difference between two single events corresponding to the LOR is t0, where t0 is within a time difference region [6,10]. The midpoint value 8 of the region is used as $t_2-t_1$ in the formula above. That is, the function center of the TOF kernel function can be obtained according to the time difference region corresponding to the time difference.

The standard deviation σ of the Gaussian function is σ=timeRes/(2√2ln2), where timeRes represents a system time resolution.

The Gaussian function can be expressed as $$g(x) = \frac{1}{\sqrt{2\pi}\sigma} e^{-\frac{(x-\mu)^2}{2\sigma^2}},$$

which is determined according to the function center and the standard deviation above, where x in the function represents a radial position corresponding to projection data.

In an example, the image is reconstructed according to the double-coincidence data in the coincidence data to obtain pixel values of the reconstruction image. In FIG. 2, the reconstruction image is obtained based on the double-coincidence data in the coincidence data. The line integral corresponds to an integral interval. The line integral is performed on the pixel values of the image in the corresponding integral interval along the LOR. The integral interval may be determined based on the TOF kernel function. For example, the integral interval satisfies $$\frac{S_1}{S} > Thre,$$

where $S_1$ represents an area between a TOF kernel function curve and the LOR in the interval; S represents a total area between the TOF kernel function curve and the LOR, and Thre represents an area proportion threshold, for example, 99%.

The integral interval corresponding to the TOF kernel function may be larger than width of an event occurrence region, e.g., three or four times as large as the width of the event occurrence region. The Gaussian function is taken as an example. To cover most of the area between the TOF kernel function curve and the LOR in the integral interval, the function center may be taken as a midpoint, and a length range including minus and plus three standard deviations is selected, i.e., [−3σ,+3σ]. Line integral is performed along the LOR in the range, e.g., multiplying a pixel value of each pixel point of the image on the LOR by the TOF kernel function and accumulating products to obtain a line integral value. The above selected integral range [−3σ,+3σ] is just as an example, the integral interval is not limited herein. When the above range on the LOR does not go through the reconstructed image, the pixel value is equal to 0. For example, in FIG. 2, the pixel values of the image on the path of the $LOR_{23}$ is equal to 0.

According to the method above, for each of the LORs associated with the multiple-coincidence data, the TOF kernel function is determined according to the time difference between the two single events corresponding to the LOR. The line integral is performed for the TOF kernel function and the pixel values of the image along the LOR in the integral interval to obtain the line integral value corresponding to the LOR.

For example, the above-mentioned triple coincidence data "D3, D4 and D5" is taken as an example.

The line integral along the $LOR_{12}$ may be calculated by a formula as follows:

$$\text{Prob}(LOR_{12}) = \int_{L_{12}} g_{12} I_{12} dl$$

In the formula above, the integral interval $L_{12}$ in the integral formula above may be obtained by the TOF kernel function determined according to the time difference between the two single events D3 and D4. The integral interval may be larger than the width of the event occurrence region in a way that the integral interval can include most of the area between the TOF kernel function and the LOR. The Gaussian function $g_{12}$ is determined according to the time difference between D3 and D4, or is determined according to to the midpoint of the time difference region including the time difference between D3 and D4. $I_{12}$ is the pixel value of a pixel point of the reconstruction image in the integral interval $L_{12}$.

The line integral along the $LOR_{13}$ is calculated by a formula as follows:

$$\text{Prob}(LOR_{13}) = \int_{L_{13}} g_{13} I_{13} dl$$

In the formula above, the integral interval $L_{13}$ is determined according to the TOF kernel function corresponding to the $LOR_{13}$ in FIG. 2. The Gaussian function $g_{13}$ is determined according to the time difference between the two single events D3 and D5 in FIG. 2, or is determined according to the midpoint of the time difference region including the time difference between D3 and D5. The pixel value $I_{13}$ of the image is a pixel value of a pixel point of the reconstruction image in the integral interval $L_{13}$ determined according to the kernel function corresponding to the $LOR_{13}$.

The line integral along the $LOR_{23}$ is calculated by a formula as follows:

$$\text{Prob}(LOR_{23}) = \int_{L_{23}} g_{23} I_{23} dl$$

In the formula above, the integral interval $L_{23}$ is determined according to the TOF kernel function corresponding to the $LOR_{23}$ in FIG. 2. The Gaussian function $g_{23}$ is determined according to the time difference between the two single events D4 and D5 in FIG. 2, or is determined according to the midpoint of the time difference region including the time difference between D4 and D5. The image pixel value $I_{23}$ is a pixel value of a pixel point of the reconstruction image in the integral interval $L_{23}$.

A plurality of methods can be used for calculating a line integral, e.g., transforming a line integral into parametric equations corresponding to a line. The line integral corresponding to the $LOR_{12}$ is taken as an example. A midpoint between two crystals is expressed by a point M $(x_c, y_c, z_c)$. The line may be expressed as the parametric equations with $k \in [-1, +1]$:

$$\begin{cases} x = x_c + k(x_2 - x_1)/2 \\ y = y_c + k(y_2 - y_1)/2 \\ z = z_c + k(z_2 - z_1)/2 \end{cases}$$

For any $k \in [-1, +1]$, a distance to the center of the line (e.g., a location where the time difference is equal to 0) is:

$$Dis(k) = \frac{k}{2}(\text{length of } LOR_{12})$$

In this case, the line integral may be expressed in a form of a single integral:

$$\text{Prob}(LOR_{12}) = \int_{-1}^{+1} g(Dis(k)) l(x,y,z) dk$$

In an example, the parameter σ of a Gaussian function is small relative to the integral range, thus, the integral range is narrowed. The integral value of the Gaussian function outside 6σ is generally equal to 1% of the integral value of the Gaussian function, which can be neglected.

In another example, for a PET image reconstructed according to the double-coincidence data, TOF orthographic projection is performed for the image in each event occurrence region on each LOR to obtain a line integral value corresponding to the event occurrence region on the LOR. The process of performing the TOF orthographic projection for the image in the event occurrence region on the LOR is equivalent to performing line integration for a TOF kernel function and the image along the LOR, where a function center of the TOF kernel function is determined according to the midpoint of the event occurrence region. According to the method, a line integral value corresponding to each event occurrence region on each of the LORs is pre-obtained. When the multiple-coincidence data is allocated, the line integral value corresponding to the event occurrence region is directly obtained according to a pre-obtained correspondence. In particular, different LORs corresponding to the multiple-coincidence data is determined. According to a time difference between two single events corresponding to each of the LORs, the event occurrence region corresponding to the time difference is determined; and the line integral value corresponding to the event occurrence region is directly obtained according to the pre-obtained correspondence.

Further, the TOF orthographic projection for the reconstruction image may be performed on all LORs, or may be performed on each of the LORs associated with the multiple-coincidence data.

At step 103, according to a proportion of the line integral values corresponding to the LORs, the multiple-coincidence data is allocated to the LORs to obtain multiple allocation data on the LORs.

For example, the triple coincidence data "D3, D4 and D5" is taken as an example. The triple-coincidence data may be allocated according to the proportion of the line integral values corresponding to $LOR_{12}$, $LOR_{13}$ and $LOR_{23}$ calculated in step 103. In FIG. 2, the $LOR_{23}$ is not overlapped with the reconstruction image, the pixel values in the event occurrence region is equal to zero, thus, the line integral value along the $LOR_{23}$ is equal to zero. The $LOR_{12}$ and the $LOR_{13}$ are respectively overlapped with the reconstruction image, thus, the line integral values along the $LOR_{12}$ and the $LOR_{13}$ are not equal to zero. For example, the line integral value of the $LOR_{12}$ is large, the line integral value of the $LOR_{13}$ is small, and the line integral value of the $LOR_{23}$ is zero, where a ratio of the line integral value of the $LOR_{12}$ to the line integral value of the $LOR_{13}$ is 7/3. 70% of the triple-coincidence data is allocated to the $LOR_{12}$, and 30% of the triple-coincidence data is allocated to $LOR_{13}$. For example, it is assumed that a count value in the double-coincidence data on the $LOR_{12}$ is X, a count value in the double-coincidence data on the $LOR_{13}$ is Y, and a count value in the double-coincidence data on the $LOR_{23}$ is Z. A count value of the multi-coincidence data is M, e.g., M=1. When the multiple-coincidence data is allocated to the $LOR_{12}$, the $LOR_{13}$ and the $LOR_{23}$, the count value in the double-coincidence data on the $LOR_{12}$ is updated to be X+0.7M, the count value in the double-coincidence data on the $LOR_{13}$ is updated to be Y+0.3M, and the count value in the double-coincidence data on the $LOR_{23}$ is not changed and remains to be Z.

In the example, when the the multiple-coincidence data is allocated to the LORs, data allocated to the LORs may be multiple allocation data.

According to the multiple-coincidence data allocating method above, an event allocation proportion corresponding to an LOR is associated with pixel values of an image in an integral interval corresponding to the event on the LOR. In the example above, in a multiple-coincidence event, an LOR is not overlapped with the reconstruction image (e.g., the pixel values for which the line integral is performed is equal to zero). Thus, the line integral value is equal to zero, and an occurrence position of an annihilation event is not on the LOR. That is, even though a count of the double-coincidence data on the LOR is not zero, the LOR is not involved in the multiple-coincidence data allocation. i.e., the multiple-coincidence data is not allocated for the LOR. When no line integral values respectively along three LORs is equal to zero, i.e., the three LORs are respectively overlapped with the reconstruction image, an allocation proportion is estimated according to the line integral values corresponding to the pixel values of the image on the three LORs. When a line integral value for an LOR is large, it is possible that the pixel values in the integral interval on the LOR is large, and a probability that an annihilation event occurs is large, therefore, a probability that the coincidence event occurs on the LOR is large. Thus, according to the data allocating method, the multiple-coincidence data can be accurately allocated.

At step 104, the double-coincidence data and the multiple allocation data on each of the LORs associated with the coincidence data are added together to obtain data of the LOR.

For each of the LORs, the coincidence data corresponding to annihilation events which occur on the LOR includes double-coincidence data and multiple-coincidence data. In the example, the multiple-coincidence data allocated to the LOR in the step above and the double-coincidence data on the LOR are added together to obtain the data of the LOR.

At step 105, a PET image is reconstructed according to data of each of the LORs.

In the step, the PET image is reconstructed according to an image reconstruction algorithm, which will not be described herein.

In examples of the method of reconstructing a PET image, multiple-coincidence data is allocated to each of LORs according to a proportion of line integral values of the LORs in a way that a PET sensitivity is effectively improved, and a quality of the image reconstructed according to the coincidence data of the LOR is good. Further, the method is associated with the pixel values of the image and the time difference, which is not affected when the data is not sufficient.

In an example, the PET image reconstruction includes a plurality of corrections, so that reconstruction data is accurate, e.g., random correction, normalization correction, scatter correction and attenuation correction. The corrections can be performed according to various methods, which is be not repeatedly described. In an example of a method of reconstructing a PET image in FIG. 3, normalization corrections 305, 306 are respectively performed for double-coincidence data 301 and allocated multiple-coincidence data 302. Random correction 303 is performed based on a random correction factor, which is an addition factor and related with a single-event count rate. In a process in FIG. 3, the random correction 303 is performed on a left path of processing the double-coincidence data, and is not performed on a right path of processing the multiple-coincidence data. Thus, it is avoided to repeating random corrections.

Figure 3:
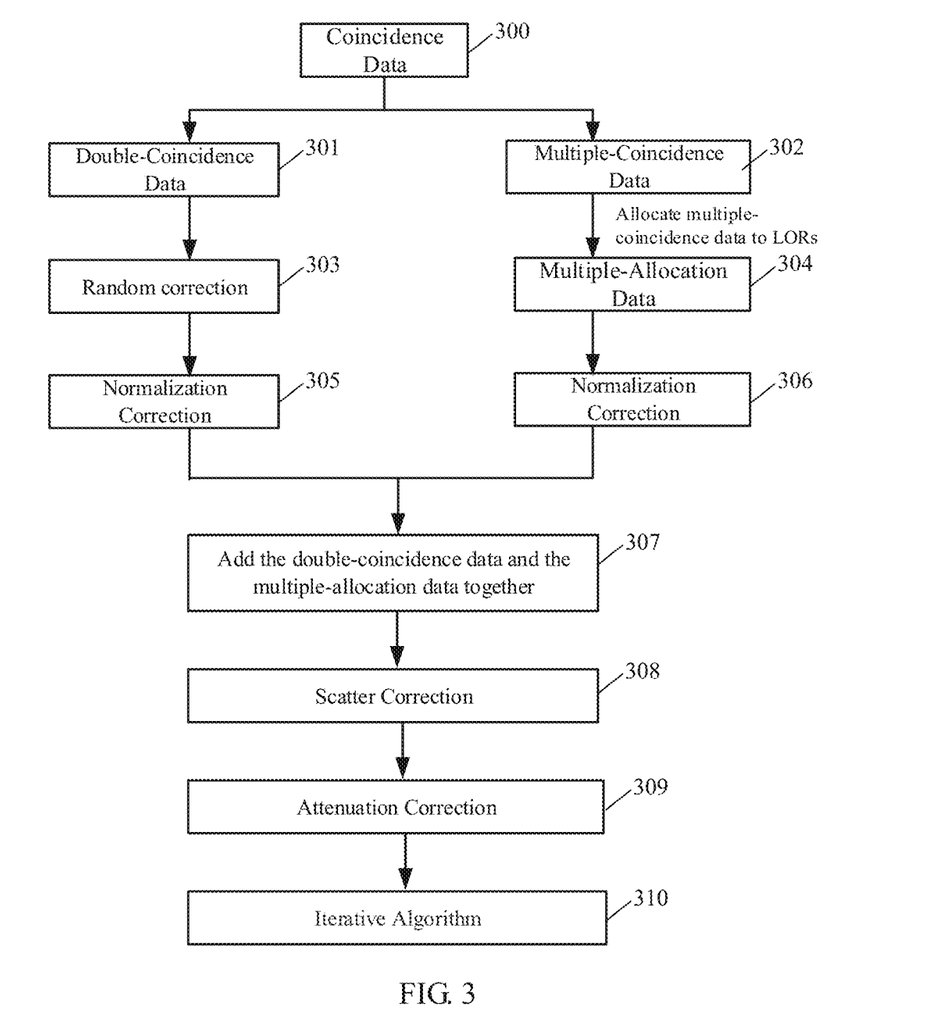
FIG. 3 is a flowchart illustrating a method of reconstructing a PET image according to an example of the present disclosure.

Scatter correction 308 and attenuation correction 309 are performed after the double-coincidence data and the multiple allocation data are added (307) together. That is, the scatter correction 308 and the attenuation correction 309 are combined with a subsequent iterative reconstruction algorithm 310 performed after the coincidence data is added together. Thus, Poisson distribution characteristics of data can be maintained, and iterative reconstruction quality of an image is good.

Further, in FIG. 3, the multiple-coincidence data is allocated to on each of the LORs according to the method in the examples above, which is not repeatedly described herein. In an example, the double-coincidence data detected by a PET device may be replicated to be a copy of the double-coincidence data. One of the original double-coincidence data and the copy double-coincidence data is used for reconstructing a PET image, and line integral is performed for the reconstructed PET image along the LOR. The other is processed based on the process in FIG. 3, which is added with the multiple allocation data to obtain the coincidence data.

Figure 4:
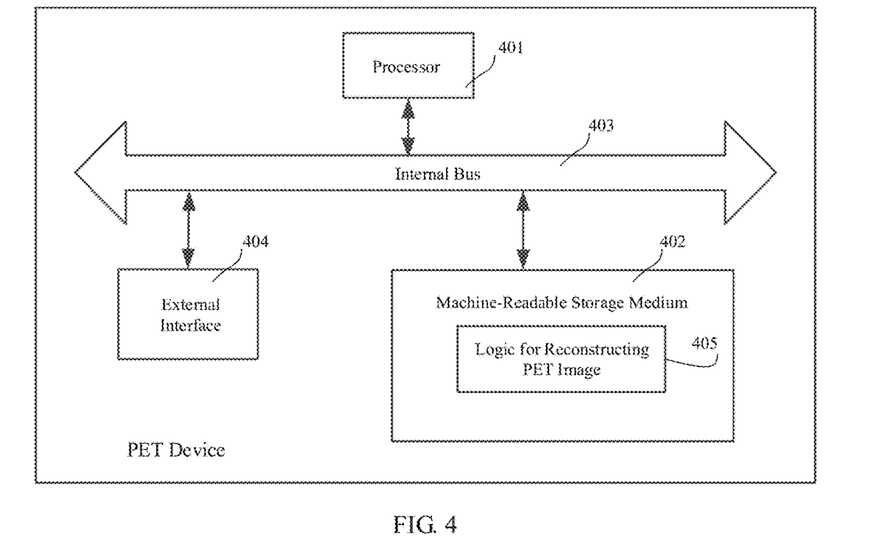
FIG. 4 is a schematic diagram of a structure of a PET device according to an example of the present disclosure.

Referring to FIG. 4, a PET device is further provided according to examples of the present disclosure. In the PET device, after a γ-photon generated by an annihilation event is detected by a PET detector, data such as a collection time, energy and a position of the photon, is obtained. Coincidence data such as double-coincidence data and multiple-coincidences data is obtained by performing coincidence determination according to the obtained data. The coincidence data may be sent to an image reconstructing device to reconstruct a PET image according to the coincidence data.

FIG. 4 schematically illustrates a hardware structure diagram of a PET device, which is provided by an example of the present disclosure. The PET device may include a processor 401 and a machine-readable storage medium 402 storing machine executable instructions. The processor 401 may communicate with the machine-readable storage medium 402 via an internal bus 403, and execute the method described above by reading and executing the machine executable instructions corresponding to control logic in the machine-readable storage medium 402. The PET device may further include an external interface 404 to communicate with another device or component.

As used herein, the machine-readable storage medium 402 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 5:
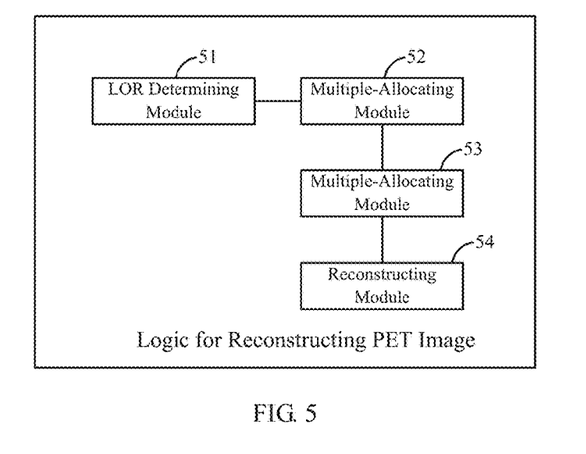
FIG. 5 is a schematic diagram of a structure of logic for reconstructing a PET image according to an example of the present disclosure.

As shown in FIG. 5, functionally divided, the logic for reconstructing a PET image above may include modules as follows.

An LOR determining module 51 is configured to determine a plurality of Lines of Response (LORs) associated with multiple-coincidence data in coincidence data detected by a PET device through scanning, where the coincidence data includes double-coincidence data indicating that two single events satisfy a coincidence condition and the multiple-coincidence data indicating that three or more single events satisfy the coincidence condition, and each of the LORs is a line between crystals corresponding to every two of three or more single events corresponding to the multiple-coincidence data.

A multiple-allocating module 52 is configured to obtain a line integral value along each of the LORs associated with the multiple-coincidence data according to a time difference between two single events corresponding to the LOR associated with the multiple-coincidence data; allocate the multiple-coincidence data to the LORs according to respective line integral values of the LORs associated with the multiple-coincidence data, where a part of the multiple-coincidence data allocated to each of the LORs is multiple allocation data on the LOR.

A data adding module 53 is configured to correct the respective double-coincidence data in the coincidence data corresponding to each of the LORs based on the multiple allocation data on the LOR to obtain data of the LOR.

A reconstructing module 54 is configured to reconstruct a first image according to the data of each of the LORs.

Figure 6:
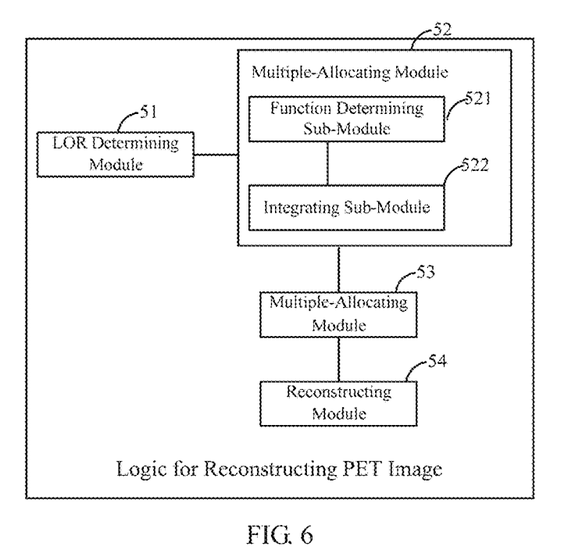
FIG. 6 is a schematic diagram of a structure of logic for reconstructing a PET image according to an example of the present disclosure.

In an example, as shown in FIG. 6, the multiple-allocating module 52 includes sub-modules as follows.

A function determining sub-module 521 is configured to determine a Time-of-Flight (TOF) kernel function according to the time difference between the two single events corresponding to the LOR associated with the multiple-coincidence.

An integrating sub-module 522 is configured to integrate the TOF kernel function and pixel values of a second image in a pre-determined range along the LOR to obtain the line integral value of the LOR associated with the multiple-coincidence data, where the second image is reconstructed according to the double-coincidence data in the coincidence data.

In an example, the function determining sub-module 521 is configured to obtain a function center of the TOF kernel function according to the time difference between the two single events and determine the TOF kernel function according to the function center.

In an example, the function determining sub-module 521 is configured to obtain a midpoint of a time difference region corresponding to the time difference between the two single events, obtain a function center of the TOF function according to the midpoint, and determine the TOF kernel function according to the function center.

Figure 7:
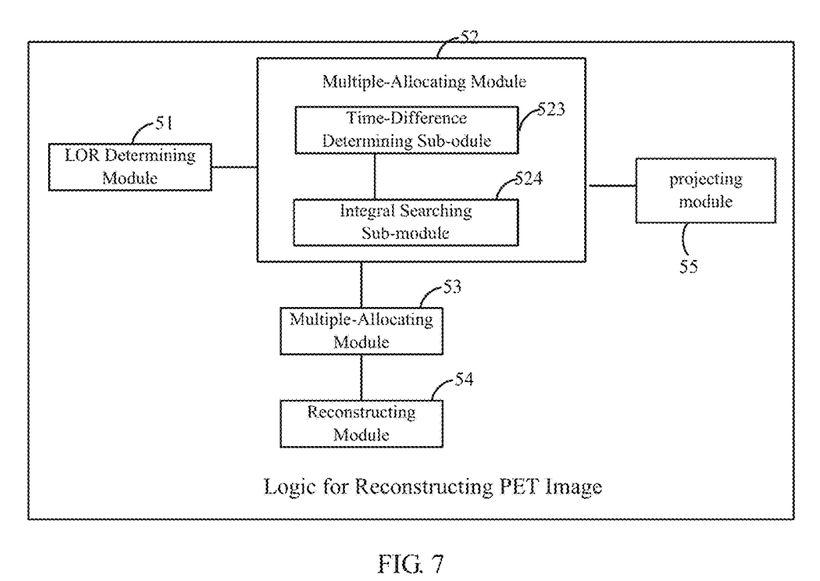
FIG. 7 is a schematic diagram of a structure of logic for reconstructing a PET image according to an example of the present disclosure.

In an example, as shown in FIG. 7, the logic further includes a projecting module 55. The projecting module 55 is configured to divide the LOR into a plurality of event occurrence regions based on time difference regions, perform TOF orthographic projection for a second image to obtain a line integral value corresponding to each of event occurrence regions on the LOR, where the second image is reconstructed according to the double-coincidence data in the coincidence data, build a correspondence between time difference region and line integral value corresponding to event occurrence region on the LOR, and obtain the line integral value along the LOR associated with the multiple-coincidence data according to the time difference between the two single events corresponding to the LOR associated with the multiple-coincidence data and the correspondence between time difference region and line integral value on the LOR.

In an example, the multiple-allocating module 52 includes sub-modules as follows.

A time-difference determining sub-module 523 is configured to determine a Time-of-Flight (TOF) kernel function according to the time difference between the two single events corresponding to the LOR associated with the multiple-coincidence.

An integral searching sub-module 524 is configured to obtain the line integral value along the LOR associated with the multiple-coincidence data according to the time difference between the two single events corresponding to the LOR associated with the multiple-coincidence data and the correspondence between time difference region and line integral value on the LOR.

In an example, the reconstructing module 54 is configured to generate a scatter correction factor and an attenuation correction factor according to the data of each of the LORs, reconstruct the first image according to the scatter correction factor, the attenuation correction factor and the data of each of the LORs.

In different examples, the machine readable storage medium 402 may be: a Read-Only Memory (ROM), a volatile memory, a non-volatile memory, a flash memory, a storage drive (e.g. hard disk drive), a solid state hard disk, any type of storage disk (e.g., optical disk, Digital Video Disk (DVD)), or a similar storage medium, or a combination thereof.

The foregoing disclosure is merely illustrative of preferred embodiments of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of reconstructing a Positron Emission Computed Tomography (PET) image, comprising:
determining a plurality of Lines of Response (LORs) associated with multiple-coincidence data in coincidence data detected by a PET device through scanning, wherein the coincidence data comprises double-coincidence data indicating that two single events satisfy a coincidence condition and the multiple-coincidence data indicating that three or more single events satisfy the coincidence condition, and each of the LORs is a line between crystals corresponding to every two of the three or more single events corresponding to the multiple-coincidence data;
obtaining, for each of the LORs, a respective line integral value along the LOR according to a time difference between two single events corresponding to the LOR;
allocating the multiple-coincidence data to the LORs according to the obtained respective line integral values of the LORs associated with the multiple-coincidence data, wherein a respective part of the multiple-coincidence data allocated to each of the LORs is respective multiple allocation data on the LOR;
correcting, for each of the LORs, respective double-coincidence data in the coincidence data corresponding to the LOR based on the respective multiple allocation data on the LOR to obtain respective data of the LOR; and reconstructing an image according to the respective data of each of the LORs.

2. The method of claim 1, wherein obtaining the respective line integral value along the LOR comprises:

determining a Time-of-Flight (TOF) kernel function according to the time difference between the two single events corresponding to the LOR; and integrating the TOF kernel function and pixel values of a second image in a corresponding range along the LOR to obtain the line integral value of the LOR associated with the multiple-coincidence data, wherein the second image is reconstructed according to the double-coincidence data in the coincidence data.

3. The method of claim 2, wherein the corresponding range is determined based on the TOF kernel function and has a width larger than a width of an event occurrence region on the LOR that is determined based on the time difference between the two single events.

4. The method of claim 2, wherein determining the TOF kernel function according to the time difference between the two single events comprises:

obtaining a function center of the TOF kernel function according to the time difference between the two single events; and determining the TOF kernel function according to the function center.

5. The method of claim 2, wherein determining the TOF kernel function according to the time difference between the two single events comprises:

obtaining a midpoint of a time difference region corresponding to the time difference between the two single events;

obtaining a function center of the TOF function according to the midpoint; and determining the TOF kernel function according to the function center.

6. The method of claim 1, wherein obtaining the respective line integral value along the LOR comprises:

dividing the LOR into a plurality of event occurrence regions based on time difference regions;

performing TOF orthographic projection for a second image to obtain a respective line integral value corresponding to each of the plurality of event occurrence regions on the LOR, wherein the second image is reconstructed according to the double-coincidence data in the coincidence data;

generating correspondences between the time difference regions and the respective line integral values corresponding to the plurality of event occurrence regions on the LOR; and obtaining the line integral value along the LOR according to the time difference between the two single events corresponding to the LOR and the correspondences.

7. The method of claim 1, wherein allocating the multiple-coincidence data to the LORs according to the obtained respective line integral values of the LORs associated with the multiple-coincidence data comprises:

allocating a respective proportion of a count value of the multiple-coincidence data to each of the LORs according to the respective line integral values of the LORs associated with the multiple-coincidence data.

8. The method of claim 1, wherein correcting the respective double-coincidence data in the coincidence data corresponding to the LOR based on the respective multiple allocation data on the LOR comprises:

adding a count value of the multiple allocation data on the LOR and a count value of the double-coincidence data corresponding to the LOR together to obtain a corrected count value; and taking the corrected count value as a count value of the data of the LOR.

9. The method of claim 1, wherein reconstructing the image according to the respective data of each of the LORs comprises:

generating a scatter correction factor and an attenuation correction factor according to the respective data of each of the LORs; and reconstructing the image according to the scatter correction factor, the attenuation correction factor and the respective data of each of the LORs.

10. A PET device, comprising:

a processor, and a non-transitory machine-readable storage medium storing machine executable instructions which are executable by the processor to:

determine a plurality of Lines of Response (LORs) associated with multiple-coincidence data in coincidence data detected by a PET device through scanning, wherein the coincidence data comprises double-coincidence data indicating that two single events satisfy a coincidence condition and the multiple-coincidence data indicating that three or more single events satisfy the coincidence condition, and each of the LORs is a line between crystals corresponding to every two of the three or more single events corresponding to the multiple-coincidence data;

obtain, for each of the LORs, a respective line integral value along the LOR according to a time difference between two single events corresponding to the LOR;

allocate the multiple-coincidence data to the LORs according to the obtained respective line integral values of the LORs associated with the multiple-coincidence data, wherein a respective part of the multiple-coincidence data allocated to each of the LORs is respective multiple allocation data on the LOR;

correct, for each of the LORs, respective double-coincidence data in the coincidence data corresponding to the LOR based on the respective multiple allocation data on the LOR to obtain respective data of the LOR; and reconstruct an image according to the respective data of each of the LORs.

11. The device of claim 10, wherein the processor is caused by the machine-executable instructions to:

determine a Time-of-Flight (TOF) kernel function according to the time difference between the two single events corresponding to the LOR; and integrate the TOF kernel function and pixel values of a second image in a corresponding range along the LOR to obtain the line integral value of the LOR associated with the multiple-coincidence data, wherein the second image is reconstructed according to the double-coincidence data in the coincidence data.

12. The device of claim 11, wherein the processor is caused by the machine-executable instructions to:

obtain a function center of the TOF kernel function according to the time difference between the two single events; and determine the TOF kernel function according to the function center.

13. The device of claim 11, wherein the processor is caused by the machine-executable instructions to:
obtain a midpoint of a time difference region corresponding to the time difference between the two single events;
obtain a function center of the TOF function according to the midpoint; and
determine the TOF kernel function according to the function center.

14. The device of claim 10, wherein the processor is caused by the machine-executable instructions to:
divide the LOR into a plurality of event occurrence regions based on time difference regions;
perform TOF orthographic projection for a second image to obtain a respective line integral value corresponding to each of the plurality of the event occurrence regions on the LOR, wherein the second image is reconstructed according to the double-coincidence data in the coincidence data;
generate correspondences between the time difference regions and the respective line integral values corresponding to the plurality of event occurrence regions on the LOR;
obtain the line integral value along the LOR according to the time difference between the two single events corresponding to the LOR and the correspondences.

15. The device of claim 10, wherein the processor is caused by the machine-executable instructions to:
allocate a respective proportion of count value of the multiple-coincidence data to each of the LORs according to the respective line integral values of the LORs associated with the multiple-coincidence data.

16. The device of claim 10, wherein the processor is caused by the machine-executable instructions to:
add a count value of the multiple allocation data on the LOR and a count value of the double-coincidence data corresponding to the LOR together to obtain a corrected count value; and
take the corrected count value as a count value of the data of the LOR.

17. The device of claim 10, wherein the processor is caused by the machine-executable instructions to:

generate a scatter correction factor and an attenuation correction factor according to the respective data of each of the LORs; and
reconstruct the image according to the scatter correction factor, the attenuation correction factor and the respective data of each of the LORs.

18. A method of reconstructing a Positron Emission Computed Tomography (PET) image, comprising:
reconstructing a first PET image according to double coincidence data in coincidence data detected by a PET device through scanning;
determining a plurality of lines of response (LOR) associated with multiple-coincidence data in the coincidence data, each of the LORs being a line between crystals corresponding to every two of three or more single events corresponding to the multiple-coincidence data;
determining a respective weight for each of the LORs based on a time difference between two single events corresponding to the LOR and an overlapping region between the first PET image and the LOR;
allocating the multiple-coincidence data to the LORs based on the determined respective weights to obtain respective multiple allocation data on the LORs;
correcting, for each of the LORs, respective double-coincidence data in the coincidence data corresponding to the LOR based on the respective multiple allocation data on the LOR to obtain respective data of the LOR; and
reconstructing a second PET image according to the respective data of the LORs.

19. The method of claim 18, wherein determining a respective weight for each of the LORs comprises:
determining a Time-of-Flight (TOF) kernel function according to the time difference between the two single events corresponding to the LOR; and
integrating the TOF kernel function and pixel values of the first PET image in an integral range along the LOR to obtain a line integral value of the LOR associated with the multiple-coincidence data, wherein the line integral value is determined to be the respective weight for the LOR.

20. The method of claim 18, wherein the integral range is determined based on the TOF kernel function and has a width larger than a width of an event occurrence region on the LOR that is determined based on the time difference between the two single events.

* * * * *